United States Patent Office 2,864,505
Patented Dec. 16, 1958

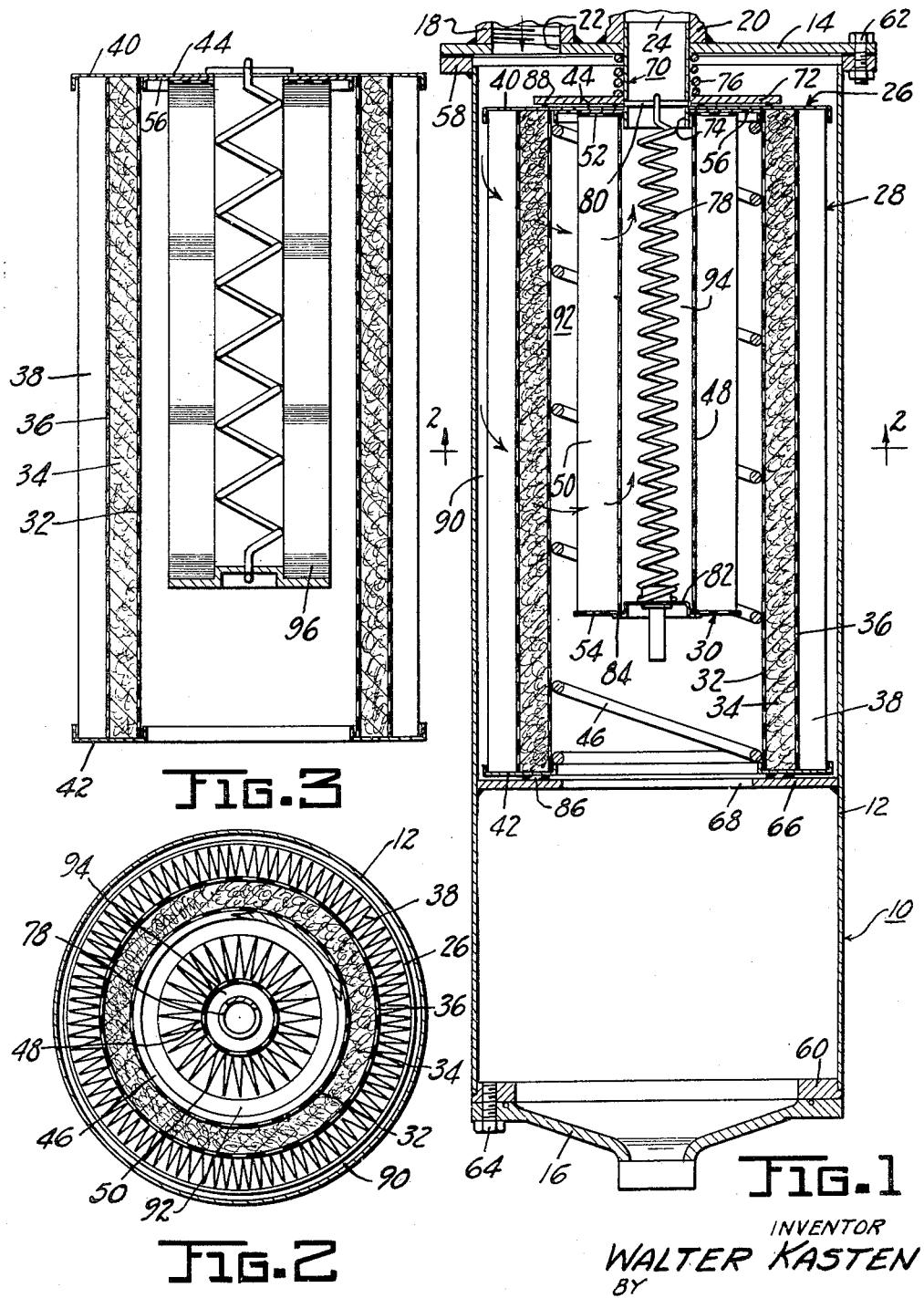
Dec. 16, 1958     W. KASTEN     2,864,505
VERTICAL TWO STAGE DEMULSIFIER FILTER ASSEMBLY
Filed Sept. 7, 1956
INVENTOR
WALTER KASTEN
BY
William N. Antonis
ATTORNEY

2,864,505

VERTICAL TWO STAGE DEMULSIFIER FILTER ASSEMBLY

Walter Kasten, Royal Oak, Mich., assignor to Bendix Aviation Corporation, South Bend, Ind., a corporation of Delaware Application September 7, 1956, Serial No. 608,534

8 Claims. (Cl. 210—315)

This invention relates to two stage filters and more particularly to a vertical two stage filter having a single combination coalescing and filtering element.

Heretofore, two stage filter assemblies have generally contained two separate filter elements for separating undesirable emulsified water and solid contaminants from liquid hydrocarbon fuels, such as gasoline. In such assemblies, the fuel normally flows through a first filter element which is called the demulsifier element. As the fuel passes through this element, the emulsified water in the fuel is coalesced, thereby forming small droplets of free water interspersed within the fuel. The second filter element prevents these droplets from passing with the fuel through the filter and also removes any solid contaminants which passesd through the first element.

Two stage filtering assemblies having separate filtering elements have been generally bulky and have necessitated the carrying of two separate elements in stock. Furthermore, serviceability of the units has been relatively poor.

It is therefore an object of this invention to provide a single unit two-stage filter element which will remove both the undesirable water and solid contaminants from a liquid hydrocarbon fuel.

Another object of this invention is to provide a compact two-stage filtering device.

A further object of this invention is to provide a two-stage filtering device which is easier to service.

A still further object of this invention is to provide a two stage filtering device which may be economically manufactured.

Another object of this invention is to provide a two stage filter demulsifier element which has a higher efficiency.

Other objects and advantages will become apparent from the following description and accompanying drawings, wherein:

Figure 1 is a vertical section of my two stage filter assembly having a single combination coalescing and filtering element;

Figure 2 is a section taken on line 2—2 of Figure 1; and

Figure 3 is a vertical section of another embodiment of a single combination coalescing and filtering element.

Referring to the drawings, numeral 10 designates a tank having a cylindrical wall 12, a cover plate 14 and a sump plate 16. Attached to the cover plate 14, by suitable means, are inlet conduit 18 and outlet conduit 20, which communicate with openings 22 and 24 in the cover plate. Connected to the sump plate 16, in a suitable manner, is an automatic water drain control valve (not shown) which permits passage of the water that accumulates at the bottom of the tank.

Within the tank 10 is a vertical single unit two-stage filter 26 which includes a demulsifier element 28 and a filter element 30. The demulsifier element 28 has a core 32 around which is wrapped a fiber glass batt 34. The core consists of a hollow cylinder which may be made of expanded metal, rigid wire mesh, or perforated metal. The batt may also be made of nylon or a similar material which has a strong affinity for the liquid to be coalesced. Wrapped around the outer layer of the fiber glass batt 34 is an onion bag cloth 36 which is stapled thereon to form a self supporting cylinder. A pleated filtering member 38 made of resin impregnated fibrous material surrounds the fiber glass batt 34 and has fiber glass bands (not shown) secured around the outer pleated portion for added rigidity and for maintaining the pleats in a proper spaced relationship. Impervious endcaps 40 and 42 made of cork or other fibrous material are cemented to the ends of the demulsifer element for sealing the ends of said element. The endcap 40 has a radially extending flange 44, the reason for which will be subsequently explained. A helical coil 46 provides internal support for the core.

The filter element 30, located within the core 32 of the demulsifier element, includes a perforated core 48, a resin impregnated pleated paper member 50 which prevents the coalesced water from passing therethrough, fiber glass bands (not shown) secured around the pleated member, and endcaps 52 and 54 to which the ends of the pleated member are attached. Attached to endcap 52 is a flanged fibrous endcap 56. This fibrous endcap 56 is in turn attached to the flange 44 of endcap 40. As a result of the inter-attachment of the endcaps, applicant has provided a unitary two-stage filter.

Referring in more detail to the tank 10, numerals 58 and 60 indicate flanges which have been welded to the cylindrical wall 12. The cover plate 14 and the sump plate 16 are fastened to the flanges 58 and 60 respectively by bolts 62 and 64 only one of which is shown in each instance. Suitable sealing means are provided between these members. Located within the tank, is a static mounting plate 66 having an opening 68, therein, which is welded to the cylindrical wall 12. In the upper portion of the tank is a pilot assembly 70 which includes a pressure plate 72, a cylindrical tube 74 attached to said pressure plate and extending through an opening 24 in the cover plate 14 and a spring 76 located between the cover plate and the pressure plate. A second spring 78, secured at its upper end by a pin 80 and at the lower end by a retainer 82 having a radially extending flange 84, urges the edge of the flange against endcap 54 thereby providing a seal at the point of contact. Spring 76 urges pressure plate 72 against the upper endcap 40 of the unit, thereby confining the unit between the static mounting plate 66 and the pressure plate 72. A seal is provided between lower endcap 42 and the static plate 66 by a gasket 86. Seals are provided on the upper endcap 40 by two sharpened circumferential flanges 88 which are formed on the pressure plate 72 and become embedded in the endcap.

By means of the structure and healing means herein described, three separate sealed chambers have been defined which may be designated by the numerals 90, 92, and 94. It will be noted that entry from one chamber to the other is possible only through the demulsifier element 28 and the filter element 30.

Operation will therefore be as follows:

The contaminated fuel will enter into chamber 90 through inlet conduit 18 and will collect around the demulsifier element 28. Because of the pressure drop across the unit, this fuel will be forced through the pleated filtering member 38, leaving any particles of solid matter which may be present on the outside surface thereof. As the fuel passes through the fibre glass batt 34, the tiny droplets of water dispersed in the fuel are coalesced into larger droplets and will tend to settle to the bottom of the tank after entering chamber 92, since water is heavier than fuel. Because of the speed of the fuel through the unit, some of the water, although coalesced into large drops, may be carried along with the fuel to the second filter element 30. These drops of water cannot pass through this filter and therefore will collect on the outside of the pleats and subsequently drop to the bottom of the tank. The fuel will be purified further by passing through pleated paper member 50 into chamber 94, from whence it will flow through cylindrical tube 74 and out of the tank through outlet conduit 20.

Figure 3 shows another embodiment of a single unit two-stage filter which incorporates a washer type edge filter element 96 for the second stage. The unit would fit into tank 10 in the same manner as shown in Figure 1. Other types of final filter elements, such as sintered metal elements, may also be used in units of the type disclosed.

The structure of the single unit two-stage filter disclosed, is such that it can be economically produced in a relatively compact package. Furthermore, the single unit permits easier serviceability of the assembly. In a two stage filter, the second stage is the more critical or more important. It must not permit any of the remaining water or dirt to pass therethrough. By having the second stage within the first stage, the final filter element is given a degree of protection by the outer element not provided by other two-stage devices. Higher filtering efficiencies are also provided by arranging the unit in the tank as shown because of the considerably less turbulence around the two-stage unit.

The several practical advantages which flow from my invention are believed to be obvious from the above description, and other advantages may suggest themselves to those who are familiar with the art to which this invention relates.

Having thus described the various features of the invention, what I claim as new and desire to secure by Letters Patent is:

1. In a filtering device for removing free water and solid contaminants from a liquid hydrocarbon, a cover plate having an inlet opening and an outlet opening, a vertical cylindrical housing connected to said cover plate so as to form a liquid tight tank, a static mounting plate located within the lower portion of the housing, said static mounting plate having an opening therein for permitting the water to settle to the bottom of said housing, an adjustable pilot assembly located in the upper portion of the housing, said pilot assembly comprising a pressure plate, a cylindrical tube attached to said pressure plate and extending through the outlet opening in the cover plate, and a spring located between the cover plate and the pressure plate, a single unit two-stage filter located between said static mounting plate and said pressure plate, said unit comprising a demulsifier element, a filtering element, and an endcap common to both of said elements attached to the ends of said elements for unifying said elements, said filtering element including a core and a pleated paper member surrounding the core, said demulsifying element including a second core telescoped over and spaced away from said pleated member, a fibre glass batt wrapped around said second core and a second pleated member surrounding said batt.

2. In a filtering device for removing free water and solid contaminants from a liquid hydrocarbon, a cover plate having an inlet opening and an outlet opening, a vertical cylidrical housing connected to said cover plate so as to form a liquid tight tank, a static mounting plate located within the lower portion of the housing, said static mounting plate having an opening therein for permitting the water to settle to the bottom of said housing, an adjustable pilot assembly located in the upper portion of the housing, said pilot assembly comprising a pressure plate, a cylindrical tube attached to said pressure plate and extending through the outlet opening in the cover plate, and resilient means located between the cover plate and the pressure plate, a single unit two-stage filter located between said static mounting plate and said pressure plate, said unit comprising a demulsifier element having an endcap with a radially extending flange, and a filtering element telescoped within said demulsifier element and attached to said radially extending flange.

3. In a filtering device for removing free water and solid contaminants from a liquid hydrocarbon, a liquid tight cylindrical tank having an inlet and an outlet, a static mounting plate located within the lower portion of said tank, said static mounting plate having an opening therein for permitting the water to settle to the bottom of said tank, an adjustable pilot assembly located in the upper portion of the tank, a single unit two-stage filter located between said static mounting plate and said pilot assembly, said unit comprising a demulsifier element, a filtering element telescoped within said demulsifier element, and an endcap common to both of said elements attached to the end of said elements for unifying said elements, sealing means located at the ends of the elements thereby forming a first chamber between the demulsifier element and the tank, a second chamber between the demulsifier element and filter element, and a third chamber within the filter element.

4. In a filtering device for removing free water and solid contaminants from a liquid hydrocarbon, a liquid tight tank having an inlet and an outlet, a static mounting plate located within the lower portion of said tank, said static mounting plate having an opening therein for permitting the water to settle to the bottom of said tank, an adjustable pilot assembly located in the upper portion of the tank, a single unit two-stage filter located between said static mounting plate and said pilot assembly, said unit comprising a demulsifier element, a filtering element, and an endcap common to both of said elements attached to the ends of said elements for unifying said elements, said filtering element including a core and a pleated paper member surrounding the core, said demulsifying element including a second core telescoped over and spaced away from said pleated member, a fibre glass batt wrapped around said second core and a second pleated member surrounding said batt.

5. In a filtering device for removing free water and solid contaminants from a liquid hydrocarbon, a liquid tight tank having an inlet and an outlet, a static mounting plate and an adjustable pilot assembly located within said tank, a single unit two-stage filter located between said static mounting plate and said pilot assembly, said unit comprising a demulsifier element, a filtering element, and an endcap common to both of said elements attached to the ends of said elements for unifying said elements, said filtering element including a washer type element, said demulsifying element including a core telescoped over and spaced away from said pleated member, a fibre glass batt wrapped around said second core and a pleated member surrounding said batt.

6. In a filtering device for removing free water and solid contaminants from a liquid hydrocarbon, a liquid tight tank having an inlet and an outlet, a single unit two-stage filter located within said tank, said filter comprising a first core, a pleated paper member around said core, a second core telescoped over and spaced away from said pleated member, a fibre glass batt wrapped around said second core, a second pleated member surrounding said batt and endcaps attached to the ends of said pleated members, one of said endcaps being common to both of said pleated members.

7. In a filtering device for removing free water and solid contaminants from a liquid hydrocarbon, a liquid tight tank having an inlet and an outlet, a single unit two-stage filter located within said tank, said filter comprising a washer type element, a core telescoped over and spaced away from said washer type element, a fibre glass batt wrapped around said core, a pleated member surrounding said batt, and endcaps attached to the ends of the washer type element and the pleated member, one of said endcaps being common to both the washer type element and the pleated member.

8. In a device for removing free water and solid contaminants from a liquid hydrocarbon, a cover plate having an inlet opening and an outlet opening, a vertical cylindrical housing connected to said cover plate so as to form a liquid tight tank, a static mounting plate located within the lower portion of the housing, said static mounting plate having an opening therein for permitting the water to settle to the bottom of said housing, an adjustable pilot assembly located in the upper portion of the housing, said pilot assembly comprising a pressure plate, a cylindrical tube attached to said pressure plate and extending through the outlet opening in the cover plate, and resilient means located between the cover plate and the pressure plate, a single unit two stage filter located between said static mounting plate and said pressure plate, said unit comprising a demulsifier element, a filter element, and a single endcap common to both of said elements attached to the ends thereof for unifying said elements, said filter element including a core and a pleated paper member surrounding the core, said demulsifier element including a second core telescoped over and spaced away from said pleated member, a fibre glass batt wrapped around said second core and a second pleated member surrounding said batt, and means for connecting said pilot assembly to said single unit two-stage filter to form an integral removable assembly.

References Cited in the file of this patent

UNITED STATES PATENTS

| | | |
|---|---|---|
| 2,609,932 | Fricke | Sept. 9, 1952 |
| 2,612,270 | Lewis | Sept. 30, 1952 |
| 2,739,713 | Robinson | Mar. 27, 1956 |